US009813416B2

(12) United States Patent
Bolotin et al.

(10) Patent No.: US 9,813,416 B2
(45) Date of Patent: Nov. 7, 2017

(54) DATA SECURITY SYSTEM WITH ENCRYPTION

(71) Applicant: ClevX, LLC, Kirkland, WA (US)

(72) Inventors: Lev M. Bolotin, Kirkland, WA (US); Simon B. Johnson, Bonney Lake, WA (US)

(73) Assignee: ClevX, LLC, Kirkland, WA (US)

( * ) Notice: Subject to any disclaimer, the term of this patent is extended or adjusted under 35 U.S.C. 154(b) by 0 days.

(21) Appl. No.: 14/987,678

(22) Filed: Jan. 4, 2016

(65) Prior Publication Data

US 2016/0119339 A1     Apr. 28, 2016

Related U.S. Application Data

(63) Continuation of application No. 12/680,742, filed as application No. PCT/US2008/077766 on Sep. 26, 2008, now Pat. No. 9,262,611.

(Continued)

(51) Int. Cl.
*H04L 29/06* (2006.01)
*G06F 21/32* (2013.01)
*G06F 21/78* (2013.01)

(52) U.S. Cl.
CPC .......... *H04L 63/0861* (2013.01); *G06F 21/32* (2013.01); *G06F 21/78* (2013.01);
(Continued)

(58) Field of Classification Search
CPC . H04L 63/0861; H04L 63/083; H04L 63/061; H04L 63/0492; H04L 63/0876; G06F 21/78; G06F 21/32; H06L 63/0492
See application file for complete search history.

(56) References Cited

U.S. PATENT DOCUMENTS 7,069,447 B1    6/2006 Corder
7,600,130 B2 * 10/2009 Ooi .................. G06F 21/78
                                                    713/169

(Continued)

FOREIGN PATENT DOCUMENTS

KR    20010106325    11/2001
KR    20050023050     3/2005
(Continued)

OTHER PUBLICATIONS

"U.S. Appl. No. 12/680,742, Advisory Action dated Jan. 27, 2015", 3 pgs.

(Continued)

*Primary Examiner* — Matthew Smithers
(74) *Attorney, Agent, or Firm* — Schwegman Lundberg & Woessner, P.A.

(57) ABSTRACT

A data security system, and method of operation thereof, is provided that includes: an electronic authentication subsystem for verifying a user identification against an authentication key and for employing the authentication key for retrieving an encryption key, the authentication key only accessible from inside the electronic authentication subsystem, and the user identification supplied from outside the data security system to a receiver within the electronic authentication subsystem; and a storage subsystem employing the encryption key for allowing unencrypted communication through the storage subsystem between a host computer system and a storage media.

18 Claims, 5 Drawing Sheets

Related U.S. Application Data

(60) Provisional application No. 60/975,814, filed on Sep. 27, 2007.

(52) U.S. Cl.
CPC ........ *H04L 63/0492* (2013.01); *H04L 63/061* (2013.01); *H04L 63/083* (2013.01); *H04L 63/0876* (2013.01)

(56) References Cited

U.S. PATENT DOCUMENTS

| | | | |
|---|---|---|---|
| 7,801,561 B2 | 9/2010 | Parikh et al. | |
| 7,925,895 B2 | 4/2011 | Kanazawa et al. | |
| 7,941,579 B2 | 5/2011 | Uno | |
| 8,051,302 B1 | 11/2011 | Hatanaka et al. | |
| 8,832,440 B2 | 9/2014 | Johnson et al. | |
| 8,988,187 B2 * | 3/2015 | Wong | G06F 21/32 713/169 |
| 9,075,571 B2 | 7/2015 | Bolotin et al. | |
| 9,262,611 B2 * | 2/2016 | Johnson | G06F 21/32 |
| 2002/0082917 A1 | 6/2002 | Takano | |
| 2002/0194476 A1 | 12/2002 | Lewis et al. | |
| 2003/0093693 A1 | 5/2003 | Blight et al. | |
| 2003/0191955 A1 | 10/2003 | Wagner et al. | |
| 2003/0212607 A1 * | 11/2003 | Chu | G06Q 30/0635 705/26.81 |
| 2003/0226025 A1 | 12/2003 | Lin et al. | |
| 2004/0044897 A1 * | 3/2004 | Lim | G06F 21/32 713/186 |
| 2004/0172538 A1 | 9/2004 | Satoh et al. | |
| 2005/0114689 A1 * | 5/2005 | Strom | G06F 21/10 713/193 |
| 2005/0270139 A1 | 12/2005 | Park et al. | |
| 2007/0050643 A1 | 3/2007 | Negishi | |
| 2007/0192601 A1 * | 8/2007 | Spain | G06F 21/31 713/168 |
| 2007/0198856 A1 | 8/2007 | Lee et al. | |
| 2007/0239994 A1 * | 10/2007 | Kulkarni | G06F 21/602 713/189 |
| 2007/0255962 A1 * | 11/2007 | Lu | G06F 21/32 713/186 |
| 2008/0212771 A1 | 9/2008 | Hauser | |
| 2008/0267404 A1 * | 10/2008 | Budde | H04L 63/062 380/270 |
| 2009/0037748 A1 | 2/2009 | Kim et al. | |
| 2009/0097719 A1 * | 4/2009 | Lim | G06F 21/32 382/124 |
| 2010/0287373 A1 | 11/2010 | Johnson et al. | |
| 2011/0060921 A1 | 3/2011 | Michael | |
| 2011/0313922 A1 | 12/2011 | Ben Ayed | |
| 2015/0058624 A1 | 2/2015 | Borisov et al. | |
| 2016/0259736 A1 | 9/2016 | Bolotin et al. | |
| 2017/0017810 A1 | 1/2017 | Bolotin et al. | |

FOREIGN PATENT DOCUMENTS

| | | |
|---|---|---|
| TW | 537732 B | 6/2016 |
| WO | WO-2009042820 | 4/2009 |

OTHER PUBLICATIONS

"U.S. Appl. No. 12/680,742, Advisory Action dated Dec. 19, 2013", 3 pgs.

"U.S. Appl. No. 12/680,742, Final Office Action dated Sep. 27, 2013", 13 pgs.

"U.S. Appl. No. 12/680,742, Final Office Action dated Oct. 28, 2014", 16 pgs.

"U.S. Appl. No. 12/680,742, Non Final Office Action dated Mar. 12, 2013", 12 pgs.

"U.S. Appl. No. 12/680,742, Non Final Office Action dated Mar. 27, 2015", 15 pgs.

"U.S. Appl. No. 12/680,742, Non Final Office Action dated Apr. 7, 2014", 14 pgs.

"U.S. Appl. No. 12/680,742, Notice of Allowance dated Oct. 1, 2015", 8 pgs.

"U.S. Appl. No. 12/680,742, Preliminary Amendment filed Jun. 5, 2012", 2 pgs.

"U.S. Appl. No. 12/680,742, Response filed Jun. 12, 2013 to Non Final Office Action dated Mar. 12, 2013", 16 pgs.

"U.S. Appl. No. 12/680,742, Response filed Jun. 29, 2015 to Non Final Office Action dated Mar. 27, 2015", 14 pgs.

"U.S. Appl. No. 12/680,742, Response filed Jul. 7, 2014 to Non Final Office Action dated Apr. 7, 2014", 20 pgs.

"U.S. Appl. No. 12/680,742, Response filed Nov. 27, 2013 to Final Office Action dated Sep. 27, 2013", 15 pgs.

"U.S. Appl. No. 12/680,742, Response filed Dec. 29, 2014 to Final Office Action dated Oct. 28, 2014", 16 pgs.

"International Application Serial No. PCT/US2008/077766, International Preliminary Report on Patentability dated Mar. 30, 2010", 8 pgs.

"International Application Serial No. PCT/US2008/077766, International Search Report dated Mar. 31, 2009", 3 pgs.

"International Application Serial No. PCT/US2008/077766, Written Opinion dated Mar. 31, 2009", 7 pgs.

"International Application Serial No. PCT/US2017/012060, International Search Report dated Mar. 27, 2017", 2 pgs.

"International Application Serial No. PCT/US2017/012060, Written Opinion dated Mar. 27, 2017", 6 pgs.

* cited by examiner

DATA SECURITY SYSTEM WITH ENCRYPTION

CROSS-REFERENCE TO RELATED APPLICATION(S)

This is a continuation of copending U.S. patent application Ser. No. 12/680,742 filed Mar. 29, 2010, which is the National Stage of International Application number PCT/US2008/077766 filed Sep. 26, 2008, which claims the benefit of U.S. Provisional Patent Application Ser. No. 60/975,814 filed Sep. 27, 2007, and the subject matter thereof is incorporated herein by reference thereto.

The present application contains subject matter related to a concurrently filed U.S. Patent Application by Lev M. Bolotin, Alex Lemelev, and Marc Singer entitled "DATA SECURITY SYSTEM WITH ENCRYPTION", assigned to ClevX, LLC, with U.S. patent application Ser. No. 14/987,749, and filed Jan. 4, 2016.

TECHNICAL FIELD

The present invention relates generally to electronic devices, and more particularly to memory devices.

BACKGROUND ART

Security is a critical issue with almost all aspects of computer use. Storage media, such as hard disk drives attached to computers, contain valuable information, which is vulnerable to data theft. A great deal of money and effort is being applied to guarding personal, corporate, and government security information.

As portable memory storage devices have become smaller, easier to lose, more ubiquitous, cheaper, and larger in memory capacity, they have come to pose extraordinary security problems. It is now possible to download massive amounts of information surreptitiously into portable memory storage devices, such as universal serial bus flash and micro drives, cellphones, camcorders, digital cameras, iPODs, MP3/4 players, smart phones, palm and laptop computers, gaming equipment, authenticators, tokens (containing memory), etc.—in general, a mass storage device (MSD).

More specifically, there are millions of MSDs being used for backup, transfer, intermediate storage, and primary storage into which information can be easily downloaded from a computer and carried away. The primary purpose of any MSD is to store and retrieve "portable content," which is data and information tied to a particular owner not a particular computer.

The most common means of providing storage security is to authenticate the user with a computer-entered password. A password is validated against a MSD stored value. If a match occurs, the drive will open. Or, the password itself is used as the encryption key to encrypt/decrypt data stored to the MSD.

For drives that support on-the-fly encryption, the encryption key is often stored on the media in an encrypted form. Since the encryption key is stored on the media, it becomes readily available to those willing to circumvent the standard interface and read the media directly. Thus, a password is used as the key to encrypt the encryption key.

For self-authenticating drives, their authentication subsystem is responsible for maintaining security. There is no dependency on a host computer to which it is connected. Thus, a password cannot (or need not) be sent from the host in order to unlock the MSD. In fact, the encryption key no longer needs to be stored on the media. The authentication subsystem becomes the means for managing encryption keys.

Thus, a need still remains for improved security. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a data security method including: verifying a user identification against an authentication key, the user identification supplied from outside a data security system to a receiver within an electronic authentication subsystem of the data security system having a storage media; employing the authentication key for retrieving an encryption key, the authentication key only accessible from inside the electronic authentication subsystem; and employing the encryption key for allowing unencrypted communication through a storage subsystem between a host computer system and the storage media.

The present invention provides a data security system including: an electronic authentication subsystem for verifying a user identification against an authentication key and for employing the authentication key for retrieving an encryption key, the authentication key only accessible from inside the electronic authentication subsystem, and the user identification supplied from outside the data security system to a receiver within the electronic authentication subsystem; and a storage subsystem employing the encryption key for allowing unencrypted communication through the storage subsystem between a host computer system and a storage media.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
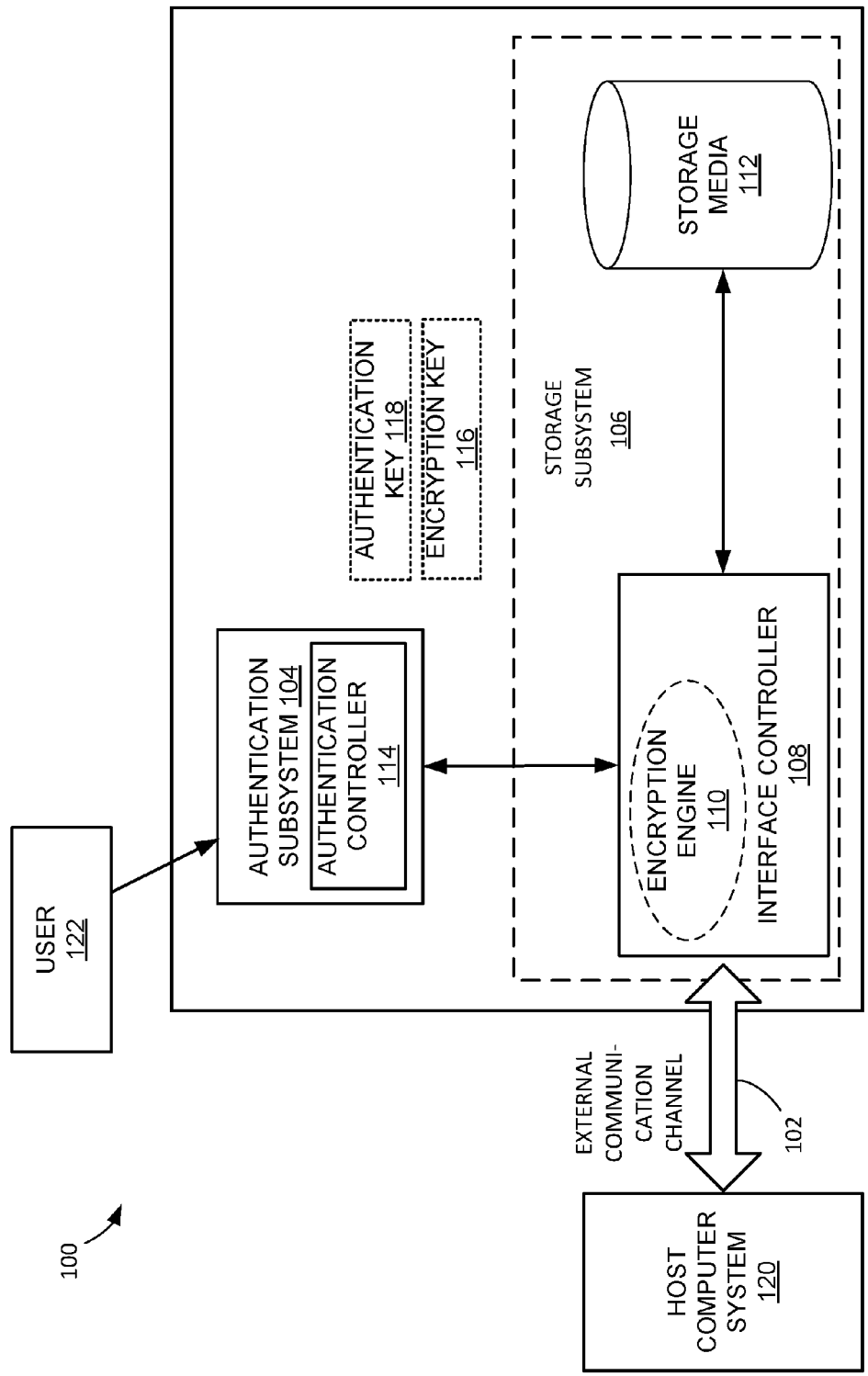
FIG. 1 is a schematic of a data security system in accordance with an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The term "system" as used herein refers to and is defined as the method and as the apparatus of the present invention in accordance with the context in which the term is used. The term "method" as used herein refers to and is defined as the operational steps of an apparatus.

For reasons of convenience and not limitation, the term "data security system" is defined as meaning any portable memory device incorporating a storage medium. The term "storage media" as used herein refers to and is defined as any solid state, NAND Flash, and/or magnetic data recording system. The term "locked" refers to the data security system when the storage media is not accessible and the term "unlocked" refers to the data security system when the storage media is accessible.

There are generally two methods to make a storage device tamper resistant:
1. Apply epoxy to components—an epoxy resin applied to the printed circuit board can make it difficult to disassemble the storage device without destroying storage media.
2. Encrypt memory data—data gets encrypted as it is written to the storage media and an encryption key is required to decipher the data.

Referring now to FIG. 1, therein is shown a schematic of a data security system 100 in accordance with an embodiment of the present invention. The data security system 100 consists of an external communication channel 102, an authentication subsystem 104, and a storage subsystem 106.

The storage subsystem 106 is electronic circuitry that includes an interface controller 108, an encryption engine 110, and a storage media 112. The storage media 112 can be an internal or external hard disk drive, USB flash drive, solid state drive, hybrid drive, memory card, tape cartridge, and optical media including optical disk (e.g., Blu-ray disk, digital versatile disk or DVD, and compact disk or CD). The storage media 112 can include a data protection appliance, archival storage system, and cloud-based data storage system. The cloud storage system may be accessed utilizing a plug-in (or "plugin") application or extension software installed in a browser application, either on the host computer or on another system coupled to the host computer via a wired or wireless connections world wide.

The interface controller 108 includes electronic components such as a micro-controller with a software or hard-wired encryption engine 110, although the encryption engine 110 can be in a separate controller in the storage subsystem 106.

The authentication subsystem 104 is electronic circuitry that includes an authentication controller 114, such as a micro-controller, which may have its own non-volatile memory, such as an electrically erasable programmable read-only memory (EEPROM).

The external communication channel 102 provides a means of exchanging data with a host computer system 120. Universal Serial Bus (USB) is one of the most popular means to connect the data security system 100 to the host computer system 120. Other examples of the external communication channel 102 include Firewire, wireless USB, Serial ATA (SATA), Thunderbolt, High Definition Multimedia Interface (HDMI), Recommended Standard 232 (RS-232), and radio frequency and WiFi (or the like) wireless networks.

The interface controller 108 is capable of translating USB packet data to data that can be written to the storage media 112 in a USB Flash Drive.

The encryption engine 110 is implemented as part of the interface controller 108 and takes clear text and/or data (information) from the host computer system 120 and converts it to an encrypted form that is written to the MSD or storage media 112. The encryption engine 110 also converts encrypted information from the storage media 112 and decrypts it to clear information for the host computer system 120. The encryption engine 110 can also be a two controller subsystem with an encryption controller that has the encryption capability to encrypt/decrypt data on the fly along with managing the communication protocol, memory, and other operating conditions and a Bluetooth communication/security controller for handling the Bluetooth communication, encryption key management, and communications with the encryption controller.

An encryption key 116 is required by the encryption engine 110 to encrypt/decrypt the information. The encryption key 116 is used in an algorithm (e.g., a 256 bit Advanced Encryption Standard (AES) encryption) that respectively encrypts/decrypts the data by an encryption algorithm to render data unreadable or readable. The encryption key 116 can be stored either internally or externally to the authentication controller 114.

The encryption key 116 is transmitted to the encryption engine 110 by the authentication subsystem 104 once a user 122, having an identification number or key, has been verified against an authentication key 118.

It has been discovered that, by the employment of the authentication key 118 and the encryption key 116, portable memory storage devices of the various embodiments of the present invention can be provide an extremely high level of security previously not available in such devices.

When the data security system 100 is locked, the authentication key 118 remains inside the authentication subsystem 104 and cannot be read from outside. One method of hiding the authentication key 118 is to store it in the authentication controller 114 in the authentication subsystem 104. Setting the security fuse of the authentication controller 114 makes it impossible to access the authentication key 118 unless the authentication controller 114 allows retrieval once the user 122 has been verified. Many micro-controllers come equipped with a security fuse that prevents accessing any internal memory when blown. This is a well-known and widely used security feature. Such a micro-controller could be used for the authentication controller 114. The authentication controller 114 can be a micro-controller or microprocessor.

The authentication key 118 can be used as in several capacities:

1. As the encryption key 116 to encrypt/decrypt the information directly.
2. As a key to recover the encryption key 116 stored in the data security system 100 that can be accessed by the interface controller 108.
3. Used for direct comparison by the interface controller 108 to activate the external communication channel 102.

Figure 2:
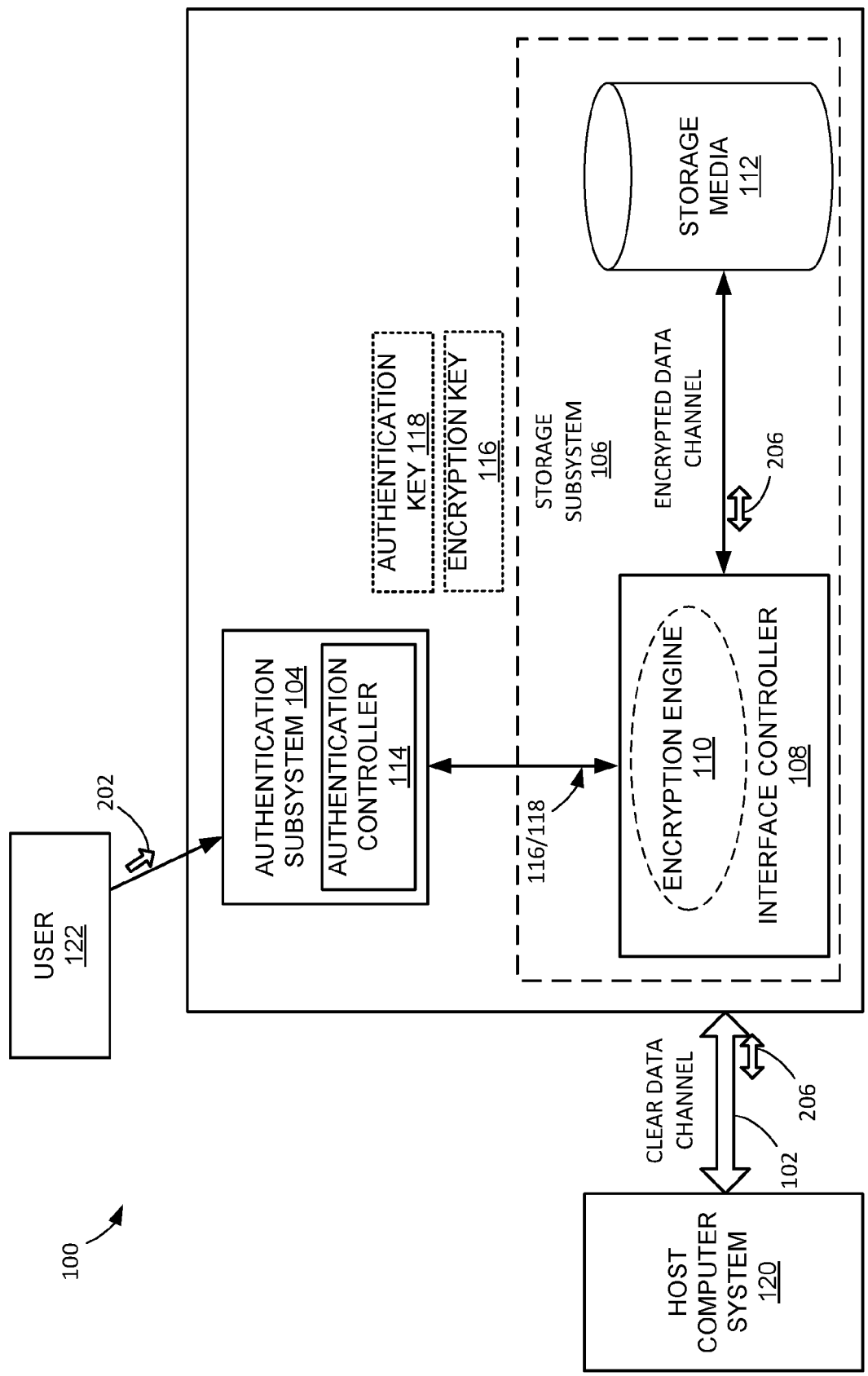
FIG. 2 is an illustration of an authentication key delivery method used with the data security system.

Referring now to FIG. 2, therein is shown an illustration of an authentication key delivery method used with the data security system 100. In this illustration, the authentication key 118 and the encryption key 116 are one and the same. The encryption engine 110 employs the authentication key 118 as the encryption key 116.

The user 122 must interact with the authentication subsystem 104 by providing user identification 202, a number or key, to the authentication subsystem 104. The authentication subsystem 104 validates the user 122 against the authentication key 118. The authentication subsystem 104 then transmits the authentication key 118 as the encryption key 116 to the interface controller 108.

The encryption engine 110 in the interface controller 108 employs the authentication key 118 to convert clear information to encrypted information and encrypted information to clear information along a channel 206. Any attempt to read encrypted information from the storage media 112 without the encryption key 116 will generally result in information that is unusable by any computer.

Figure 3:
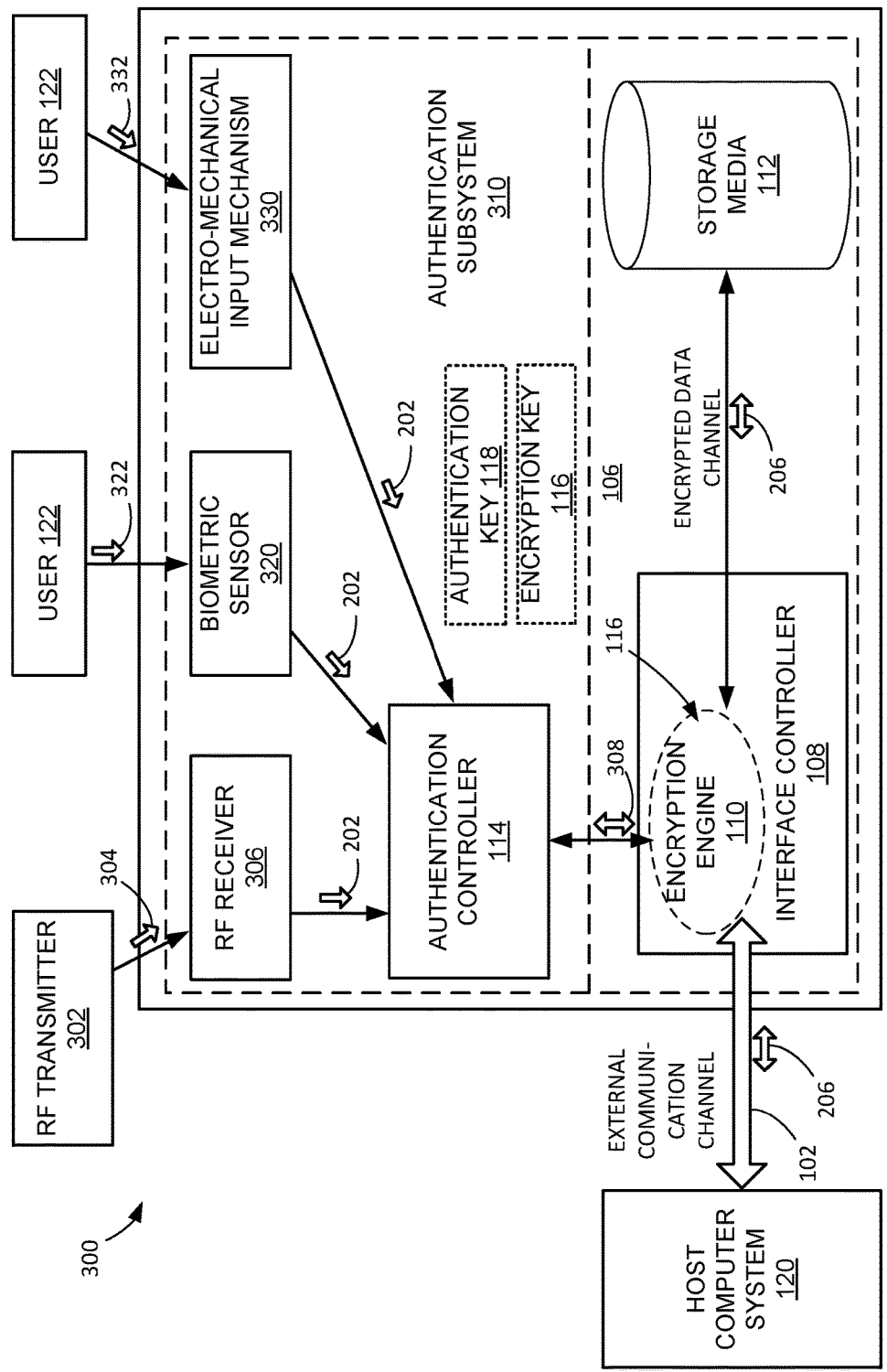
FIG. 3 is an illustration of different systems for the user to interact with the data security system.

Referring now to FIG. 3, therein is shown an illustration of different systems for the user 122 to interact with a data security system 300. The interaction can be by physical contact, wired connection, or wireless connection from a cell phone, smartphone, smart watch, wearable appliance, or other wireless device.

In one authentication system, a RF (radio frequency) transmitter 302 is employed to transmit RF user identification 304 to an RF receiver 306 in an authentication subsystem 310. The authentication subsystem 310 includes the authentication controller 114, which is connected to the interface controller 108 in the storage subsystem 106. The RF user identification 304 is supplied to the RF receiver 306 within the authentication subsystem 310 by the RF transmitter 302 from outside the data storage subsystem 106 of the data security system 300. The RF communication may include Wireless Fidelity (WiFi), Bluetooth (BT), Bluetooth Smart, Near Field Communication (NFC), Global Positioning System (GPS), or cellular communication (for example, Long-Term Evolution (LTE), Long-Term Evolution Advanced (LTE-A)), Code Division Multiple Access (CDMA), Wideband Code Division Multiple Access (WCDMA), Universal Mobile Telecommunications System (UMTS), Wireless Broadband (WiBro), Global System for Mobile Communications (GSM), and the like).

The authentication subsystem 310 validates the user 122 against the authentication key 118 by a code sent from the RF transmitter 302 being validated against the authentication key 118. The authentication subsystem 310 then transmits the encryption key 116 to the interface controller 108 across a channel 308.

The encryption engine 110 then employs the encryption key 116 to convert clear information to encrypted information and encrypted information to clear information along the channel 206. Any attempt to read encrypted information from the storage media 112 without the encryption key 116 will result in information that is unusable by the host computer system 120.

In a second authentication mechanism, the authentication subsystem 310 validates the user 122 against the authentication key 118 by having the user 122 employ a biometric sensor 320 to supply a biometric input 322 to verify his/her identity as an authorized user. Types of biometric identification include a fingerprint, an iris scan, a voice imprint, etc.

In a third authentication mechanism, The authentication subsystem 310 validates the user 122 against the authentication key 118 by having the user 122 employ an electro-mechanical input mechanism 330 to supply a unique code 332 to verify his/her identity as an authorized user. The unique code 332 can include a numerical, alphanumeric, or alphabetic code, such as a PIN. The electro-mechanical input mechanism 330 is within the authentication subsystem 310. The electro-mechanical input mechanism 330 receives the unique code 332 from the user 122 from outside of the data security system 300. The unique code 332 is supplied to the electro-mechanical input mechanism 330 within the authentication subsystem 310 from outside the data storage subsystem 106 of the data security system 300.

No matter which method is used to validate the user 122, the authentication key 118 and the encryption key 116 remain hidden until the user 122 is authenticated.

Figure 4:
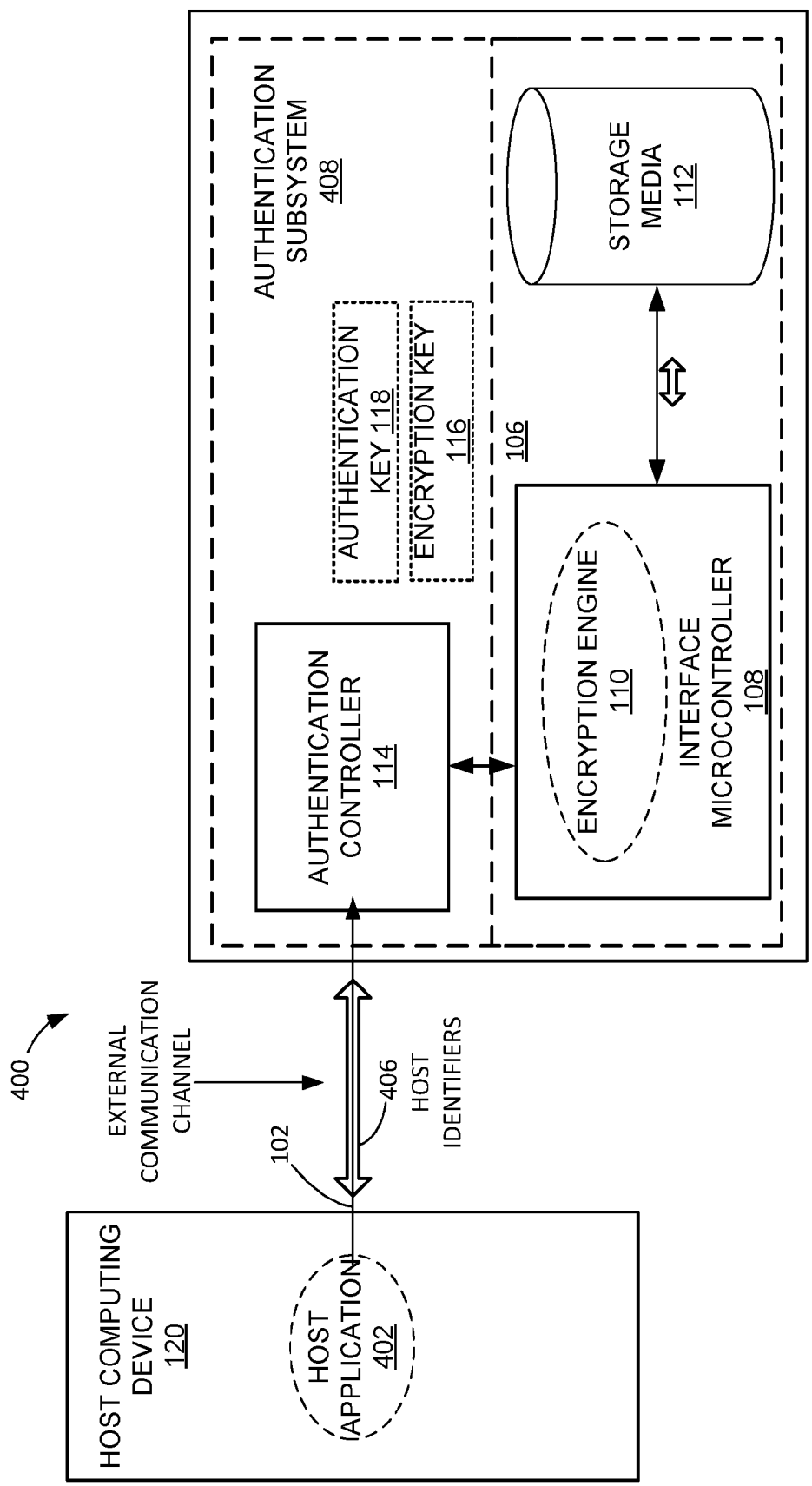
FIG. 4 is an illustration of how the user can employ the host computer system to interact with a data security system.

Referring now to FIG. 4, therein shows an illustration of how the user 122 can employ the host computer system 120 to interact with a data security system 400.

The host computer system 120 is provided with a host application 402. The host application 402 is a software program, which communicates over the external communication channel 102 of the data security system 400.

The host application 402 delivers host identifiers 406, such as internal component serial numbers (e.g. hard drive), media access control (MAC) address of a network card, login name of the user, network Internet Protocol (IP) address, an ID created by the data security system and saved to the host, an ID created by the data security system and saved to the network, etc., associated with its environment. The host identifiers 406 are employed by an authentication subsystem 408 in the data security system 400.

When the authentication subsystem 408 validates the user 122 against the authentication key 118 by verifying the host identifiers 406, the data security system 400 will unlock.

For example, the user 122 connects a locked data security system 400 to the host computer system 120. The host application 402 sends the MAC address of its network card to the locked data security system 400. The locked data security system 400 recognizes this MAC address as legitimate and unlocks without the user 122 of FIG. 1 having to enter user identification. This is implementation does not require any interaction with the user 122. In this case, it is the host computer system 120 and its associated environment that are being validated.

The data security system 400 includes: providing the authentication key 118 stored in the authentication subsystem 104; providing verification of the host computer system 120 by the authentication subsystem 104; presenting the encryption key 116 to the storage subsystem 106 by the authentication subsystem 104; and providing access to the storage media 112 by the storage subsystem 106 by way of decrypting the storage media content.

The data security system further includes the authentication subsystem 104 for interpretation of biometric input and verification of the user 122.

The data security system further includes using the authentication key 118 as the encryption key 116 directly.

The data security system further includes using the authentication key 118 to decrypt and retrieve the encryption key 116 used to decipher internal content.

The data security system further includes the authentication subsystem 104 for interpretation of RF signal inputs and verification of sending unit.

The data security system further includes the authentication subsystem 104 for interpretation of manually entered input and verification of the user 122.

The data security system further includes the authentication subsystem 104 for interpretation of input sent by a host resident software application for verification of the host computer system 120.

The data security system as further includes the encryption engine 110 outside the interface controller 108 but connected to the external communication channel 102 for the purpose of converting clear data to encrypted data for unlocking the data security system 100.

Figure 5:
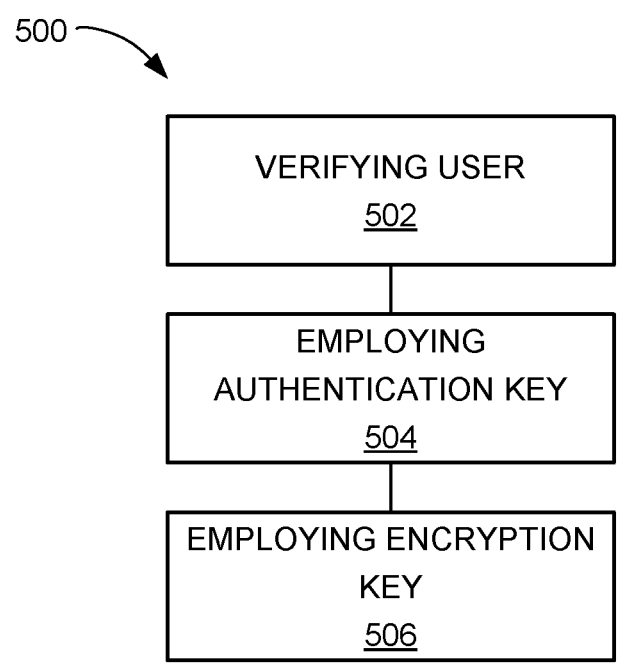
FIG. 5 is a data security method for the data security system.

Referring now to FIG. 5, therein is shown a data security method 500 for the data security system 100. The data security method 500 includes; verifying the user against an authentication key in a block 502; employing the authentication key for retrieving an encryption key in a block 504; and employing the encryption key for allowing unencrypted communication through a storage subsystem between a host computer system and a storage media in a block 506.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A data security method comprising:
    verifying a user identification against an authentication key, the user identification supplied from outside a data security system to a receiver within an electronic authentication subsystem of the data security system having a storage media;
    employing the authentication key for retrieving an encryption key, the authentication key only accessible from inside the electronic authentication subsystem, wherein the electronic authentication subsystem includes a wireless communication module coupled to an authentication controller, wherein employing the authentication key includes employing the authentication controller for hiding the authentication key; and
    employing the encryption key for allowing unencrypted communication through a storage subsystem between a host computer system and the storage media.

2. The data security method as claimed in claim 1 wherein employing the authentication key retrieves the authentication key as the encryption key.

3. The data security method as claimed in claim 1, wherein verifying the user identification includes employing the wireless communication module for providing the user identification, the wireless communication module including a radio frequency transmitter and a radio frequency receiver.

4. The data security method as claimed in claim 1, wherein verifying the user identification further includes:
    employing a biometric sensor or an electro-mechanical input mechanism for receiving the user identification.

5. The data security method as claimed in claim 1, wherein the verifying the user identification includes employing the host computer system to provide a host identifier as the user identification.

6. The data security method as claimed in claim 1, further comprising:
    connecting the host computer system to the electronic authentication subsystem.

7. The data security method as claimed in claim 6, wherein employing the electronic authentication subsystem includes:
    employing the authentication controller to receive from the host computer system a host identifier as the user identification for employing the authentication key as the encryption key.

8. The data security method as claimed in claim 6, further comprising:
    employing a radio frequency receiver in the electronic authentication subsystem for receiving the user identification.

9. A data security system comprising:
    an electronic authentication subsystem for verifying a user identification against an authentication key and for employing the authentication key for retrieving an encryption key, the authentication key only accessible from inside the electronic authentication subsystem, and the user identification supplied from outside the data security system to a receiver within the electronic authentication subsystem, wherein the electronic authentication subsystem includes a wireless communication module coupled to an authentication controller, wherein employing the authentication key includes employing the authentication controller for hiding the authentication key; and
    a storage subsystem employing the encryption key for allowing unencrypted communication through the storage subsystem between a host computer system and a storage media.

10. The data security system as claimed in claim 9, wherein the authentication controller employs the authentication key as the encryption key.

11. The data security system as claimed in claim 9, wherein the wireless communication module includes a radio frequency receiver for receiving the user identification and a radio frequency transmitter.

12. The data security system as claimed in claim 9, wherein the electronic authentication subsystem further includes a biometric sensor or an electro-mechanical input mechanism for receiving the user identification.

13. The data security system as claimed in claim 11, wherein the data security system is connectible to a host computer system.

14. The data security system as claimed in claim 13, wherein the authentication controller is configure to receive from the host computer system a host identifier as the user identification.

15. The data security system as claimed in claim 13, wherein the wireless communication module comprises a radio frequency transmitter and a radio frequency receiver for receiving the user identification.

16. The data security system as claimed in claim 13 wherein the authentication controller hides the authentication key.

17. The data security system as claimed in claim 9, wherein the verifying the user identification includes employing the host computer system to provide a host identifier as the user identification.

18. A data security method comprising:
verifying a user identification against an authentication key, the user identification supplied from outside a data security system to a receiver within an electronic authentication subsystem of the data security system having a storage media;
employing the authentication key for retrieving an encryption key, the authentication key only accessible from inside the electronic authentication subsystem; and
employing the encryption key for allowing unencrypted communication through a storage subsystem between a host computer system and the storage media, wherein the verifying the user identification includes employing the host computer system to provide a host identifier as the user identification.

* * * * *

UNITED STATES PATENT AND TRADEMARK OFFICE
CERTIFICATE OF CORRECTION

PATENT NO. : 9,813,416 B2  
APPLICATION NO. : 14/987678  
DATED : November 7, 2017  
INVENTOR(S) : Bolotin et al.

It is certified that error appears in the above-identified patent and that said Letters Patent is hereby corrected as shown below:

In the Claims

In Column 7, Line 55, in Claim 2, after "claim 1", insert --,--

In Column 8, Line 50, in Claim 13, delete "claim 11," and insert --claim 9,-- therefor In Column 8, Line 61, in Claim 16, after "claim 13", insert --,--

Signed and Sealed this  
Twenty-fifth Day of June, 2019

Andrei Iancu  
*Director of the United States Patent and Trademark Office*